Patented Mar. 15, 1932

1,849,504

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

LAMINATED GLASS AND METHOD OF PREPARING THE SAME

No Drawing.    Application filed March 13, 1929.    Serial No. 346,806.

This invention relates to the preparation of laminated glass, and relates more particularly to the use of a layer of plastic material containing a derivative of cellulose and a special plastifier for the same between sheets of glass.

An object of my invention is to prepare laminated glass that is shatterless and whose component parts are well stuck together, having therein a layer of plastic material containing a derivative of cellulose, which layer is substantially fast to light.

A further object of my invention is to employ, in the making of laminated glass, a layer of plastic material containing a derivative of cellulose, together with a plastifier for said derivative of cellulose, which plastifier has the property of causing the said derivative of cellulose to remain fast to light in the said laminated glass. Other objects of my invention will appear from the following detailed description.

In prior methods of making laminated glass, a plastic sheet containing a derivative of cellulose is placed between adhesive coated sheets of glass, and the whole pressed. Owing to impurities in the derivative of cellulose or owing to the decomposition of the derivative of cellulose, various dark colored compounds are formed when a sheet of laminated glass containing the same is exposed to sunlight. In the preparation of such plastic sheets containing derivatives of cellulose, it is necessary to add thereto plastifiers in order to impart the desired degree of plasticity. These plastifiers are used in large amounts, and the properties of the plastic material depend in part on the properties of the said plastifier.

I have found that many plastifiers that are suitable for use with derivatives of cellulose in the form of films, sheets, etc., for most applications, are not suitable for use in sheets that are to be used in laminated glass. This is due to the fact that when such sheets of plastic material are enclosed between two sheets of glass and exposed to sunlight, products are formed therefrom that are dark colored and therefore detract from the appearance of the glass. I have found, however, that if tartrate esters, such as dibutyl tartrate or diethyl tartrate, are employed as plastifiers in plastic sheets containing derivatives of cellulose that are to be used in making laminated glass, the laminated glass thus formed is substantially fast to light. Indeed the tartrate esters not only do not discolor when used in making laminated glass, but they also have a positive stabilizing effect upon impurities or the portions of the cellulose derivatives that tend to produce dark colored compounds in laminated glass in the absence of these tartrate esters.

In accordance with my invention I prepare laminated glass having a transparent plastic composition containing a derivative of cellulose and a tartrate ester as plastifier. This plastic composition may also contain stabilizers, dyes or pigments of blue or violet tint, synthetic resins compatible with the derivative of cellulose and/or stabilizers such as urea.

Any suitable derivative of cellulose may be used in my invention. It may be cellulose nitrate, but I prefer to use the organic derivatives of cellulose such as cellulose ethers or organic esters of cellulose. Examples of cellulose ethers are ethyl cellulose, methyl cellulose and benzyl cellulose while examples of organic esters of cellulose are cellulose acetate, cellulose formate, cellulose propionate and cellulose butyrate.

Of the tartrate esters that may be employed to impart light-fastness to the laminated glass, I prefer to use dibutyl tartrate but diethyl tartrate or other tartrate esters may be employed.

The plastic compositions to be employed in lamination may be formed by dissolving the derivative of cellulose and the tartrate ester in any suitable volatile solvent. Examples of such volatile solvents are acetone, benzene, ethyl acetate, methylene chloride, ethylene dichloride, methyl alcohol, ethyl alcohol, chloroform or suitable mixtures of two or more of these liquids. In the selection of the solvents or solvent mixtures, due consideration should be given to the solubility characteristics of the particular derivative of cellulose employed. If desired, resins, particularly synthetic resins compatible with the derivative of cellulose, as described below, may be added to the plastic composition and stabilizers such as urea may be employed therein. In order to correct the yellow shade of the plastic composition, I prefer to add dyes and/or pigments of blue or violet color such as ponsol blue.

For making sheets of the plastic composition, a plastic mass of the same containing volatile solvents may be worked on malaxating rolls, the sheets formed from the rolls, blocked in a press, and sheets may then be cut from such block. In another form of my invention, a coating composition may be made and the coating composition spread upon a smooth surface to permit the evaporation of the volatile solvents, and the film or sheet thus formed stripped from the smooth surface and used for the lamination process. In still another form of my invention, solutions of the ingredients may be spread onto adhesive coated sheets of glass and after evaporation of the volatile solvent, the same may be laminated with another adhesive coated sheet of glass.

In the preparation of the laminated glass, sheets of glass are used, which sheets are coated with a suitable adhesive such as gelatin, a vinyl acetate resin or a coating composition containing cellulose derivative and synthetic resin compatible with the derivative of cellulose employed. Examples of synthetic resins compatible with organic derivatives of cellulose are the soluble and fusible phenol aldehyde resins prepared in the presence of an acid catalyst such as described in my application No. 217,536 filed September 3, 1927, diphenylol propane-formaldehyde resin such as described in my application No. 227,869 filed October 21, 1927, toluene sulfonamide-formaldehyde resin, and the resin formed by heating lactic acid under reflux as fully described in applications Nos. 313,961, 313,962, 313,963 and 313,964, filed October 20, 1928.

If desired, as previously stated, a film of sufficient thickness may be formed directly on the adhesive coated glass by applying a solution containing the derivative of cellulose and the tartrate ester to such glass. The assembly of the sheets on the glass having the sheet or film of the plastic composition containing derivatives of cellulose may be pressed at elevated temperatures to form a well stuck laminated glass of highly desirable transparency. When such sheets are exposed to sunlight, the color thereof is changed but very slowly if at all.

As stated, the tartrate ester is suitable not only for use with a derivative of cellulose which does not itself show any tendency to discolor in laminated glass, but is also suitable for use with cellulose acetate or other derivatives of cellulose that have a slight tendency to discolor. Thus, if dibutyl tartrate is used as plastifier in a cellulose acetate sheet containing slightly impure cellulose acetate that tends to discolor in laminated glass, the said plastic material containing such cellulose acetate and dibutyl tartrate will be substantially light fast.

If further degree of light fastness in the laminated glass is desired, a specially purified derivative of cellulose may be employed in making the plastic sheet used in the laminated glass. The derivatives of cellulose, such as cellulose acetate, may be purified by careful and thorough filtration of solutions of the same as described in my copending application No. 313,966, or by treatment of same, either in solid form or in solution, with oxidizing agents such as nitric acid, hydrogen peroxide or a hypochlorite as described in my copending applications Nos. 313,968, filed October 20, 1928 and 334,353, filed January 22, 1929.

In order further to illustrate my invention but without limiting the scope thereof, the following specific examples are given.

*Example I*

The following is an example of a plastic sheet that may be used in making laminated glass in accordance with my invention.

|  | Parts by weight |
|---|---|
| Cellulose acetate | 100 |
| Dibutyl tartrate | 40 |

The sheet or film having the above composition may be formed by dissolving the same in suitable volatile solvents which are then permitting to evaporate.

*Example II*

The following is an example of a plastic sheet having a dyestuff added thereto to correct the yellow color.

|  | Parts by weight |
|---|---|
| Cellulose acetate | 100 |
| Dibutyl tartrate | 60 |
| Ponsol blue | 0.001 |

*Example III*

The following is an example of the composition of a plastic sheet that may be used for laminated glass in accordance with my invention.

|  | Parts by weight |
|---|---|
| Cellulose acetate | 100 |
| A compatible synthetic resin | 20 |
| Dibutyl tartrate | 40 |

The compatible synthetic resin may be the resin formed by the condensation of toluene sulfonamide with formaldehyde.

In the above examples the compositions given are that of the finished sheets or films used in lamination. These plastic compositions may also contain a trace of residual solvents employed in making such sheets or films.

It is to be understood that the foregoing detailed description is given merely by way of illustration and that many variations may be made therein without departing from the spirit of my invention.

Having described my invention what I claim and desire to secure by Letters Patent is:

1. Laminated glass that is fast to light having a sheet of plastic composition interposed between sheets of glass, said plastic composition containing an organic derivative of cellulose and a tartrate ester as plastifier.

2. Laminated glass that is fast to light having a sheet of plastic composition interposed between sheets of glass, said plastic composition containing cellulose acetate and a tartrate ester as plastifier.

3. Laminated glass that is fast to light having a sheet of plastic composition interposed between sheets of glass, said plastic composition containing cellulose propionate and a tartrate ester as plastifier.

4. Laminated glass that is fast to light having a sheet of plastic composition interposed between sheets of glass, said plastic composition containing benzyl cellulose and a tartrate ester as plastifier.

5. Laminated glass that is fast to light having a sheet of plastic composition interposed between sheets of glass, said plastic composition containing an organic derivative of cellulose and dibutyl tartrate as plastifier.

6. Laminated glass that is fast to light having a sheet of plastic composition interposed between sheets of glass, said plastic composition containing an organic derivative of cellulose and diethyl tartrate as plastifier.

7. Laminated glass that is fast to light having a sheet of plastic composition interposed between sheets of glass, said plastic composition containing cellulose acetate and dibutyl tartrate as plastifier.

8. Laminated glass that is fast to light having a sheet of plastic composition interposed between sheets of glass, said plastic composition containing cellulose acetate and diethyl tartrate as plastifier.

9. Method of preparing laminated glass comprising interposing a sheet of plastic composition between adhesive coated sheets of glass, said plastic composition containing a derivative of cellulose and a tartrate ester as plastifier and pressing at suitable temperatures, whereby laminated glass that is fast to light is produced.

10. Method of preparing laminated glass comprising interposing a sheet of plastic composition between adhesive coated sheets of glass, said plastic composition containing cellulose acetate and a tartrate ester as plastifier and pressing at suitable temperatures, whereby laminated glass that is fast to light is produced.

11. Method of preparing laminated glass comprising interposing a sheet or plastic composition between adhesive coated sheets of glass, said plastic composition containing a derivative of cellulose and dibutyl tartrate as plastifier and pressing at suitable temperatures, whereby laminated glass that is fast to light is produced.

12. Method of preparing laminated glass comprising interposing a sheet of plastic composition between adhesive coated sheets of glass, said plastic composition containing cellulose acetate and dibutyl tartrate as plastifier and pressing at suitable temperatures, whereby laminated glass that is fast to light is produced.

In testimony whereof, I have hereunto subscribed my name.

WILLIAM HENRY MOSS.